United States Patent
McNicol et al.

(10) Patent No.: US 6,853,763 B1
(45) Date of Patent: Feb. 8, 2005

(54) PHOTONIC SWITCHING INCLUDING PHOTONIC PASS-THROUGH AND ADD/DROP CAPABILITIES

(75) Inventors: John McNicol, Ottawa (CA); Babu O. Narayanan, San Jose, CA (US); Ornan A. Gerstel, Los Altos, CA (US)

(73) Assignee: Nortel Networks Limited, Quebec (CA)

( * ) Notice: Subject to any disclaimer, the term of this patent is extended or adjusted under 35 U.S.C. 154(b) by 73 days.

(21) Appl. No.: 10/259,240

(22) Filed: Sep. 27, 2002

Related U.S. Application Data

(60) Provisional application No. 60/368,299, filed on Mar. 27, 2002.

(51) Int. Cl.[7] .............................. G02B 6/26; G02B 6/42
(52) U.S. Cl. .............................. 385/17; 398/50; 398/83
(58) Field of Search .............................. 385/16, 17, 24; 398/45–57, 68, 69, 79, 83

(56) References Cited

U.S. PATENT DOCUMENTS

| 5,907,417 | A | | 5/1999 | Darcie et al. ................ 359/110 |
|---|---|---|---|---|
| 6,115,517 | A | * | 9/2000 | Shiragaki et al. ............. 385/24 |
| 6,366,716 | B1 | * | 4/2002 | Graves ........................ 385/17 |
| 2003/0002779 | A1 | * | 1/2003 | Bobin et al. .................. 385/17 |
| 2003/0128985 | A1 | * | 7/2003 | Elbers et al. ................. 398/83 |
| 2003/0152072 | A1 | * | 8/2003 | Guild et al. ................. 370/386 |

FOREIGN PATENT DOCUMENTS

EP          0 835 005 A2     4/1998   ............ H04J/14/02

* cited by examiner

*Primary Examiner*—Mark A. Robinson
*Assistant Examiner*—Alessandro Amari
(74) *Attorney, Agent, or Firm*—Bromberg & Sunstein LLP

(57) ABSTRACT

A photonic switching apparatus includes primary photonic switching logic to perform photonic pass-through and add/drop functions and secondary photonic switching logic to reduce the effective number of add/drop interfaces and/or switch optical signal channels to and from clients or client adaptation devices.

20 Claims, 8 Drawing Sheets

PHOTONIC SWITCHING INCLUDING PHOTONIC PASS-THROUGH AND ADD/DROP CAPABILITIES

PRIORITY

The present application claims priority from U.S. Provisional Patent Application No. 60/368,299 filed Mar. 27, 2002, which is hereby incorporated herein by reference in its entirety.

FIELD OF THE INVENTION

The present invention relates generally to optical networking, and more particularly to a photonic switching apparatus including photonic pass-through and add/drop capabilities.

BACKGROUND OF THE INVENTION

Optical networks carry information in the form of light over optical fibers. Various forms of wavelength division multiplexing (WDM) can be used to carry multiple optical signal channels over a single optical fiber, specifically by conveying each optical signal channel using a different optical wavelength. Optical signals can be switched using various types of networking devices, such as optical add/drop multiplexers, optical cross-connect switches, and routers.

Nodes in optical networks can be generally categorized as being either opaque or photonic. An opaque node is one in which optical signals are converted into electronic information for processing in the electrical domain. A photonic node is one in which optical signals are processed in the optical domain.

Photonic switching nodes can perform different types of switching functions on optical signal channels. One switching function, referred to hereinafter as "photonic pass-through," switches an optical signal channel from an input fiber to one of a number of output fibers. Another switching function, referred to hereinafter as "add/drop multiplexing," removes (drops) an optical signal channel from an input fiber and/or adds an optical signal channel to an output fiber. The dropped optical signal channels can be directed toward one or more clients. The added optical signal channels can be provided by one or more clients.

Photonic pass-through and add/drop multiplexing can be accomplished using a large photonic cross-connect switch (PXC) that is connected to the input and output fibers as well as to various add/drop interfaces. Such a large PXC is typically very expensive.

Photonic pass-through and add/drop multiplexing can also be accomplished using a number of small switches, each dedicated to a single wavelength or waveband, and each having a number of line interfaces and a number of add/drop interfaces that operate on its respective wavelength or waveband. A photonic switch that uses this approach is referred to hereinafter as a "wavelength plane switch" or "WPS." A special case of this design uses 2×2 switches or a pair of 1×2 switches to connect two lines to two add/drop interfaces in an optical add/drop multiplexer (OADM) configuration.

SUMMARY OF THE INVENTION

In accordance with one aspect of the invention, a photonic switching apparatus includes primary photonic switching logic to perform photonic pass-through and add/drop functions and secondary photonic switching logic to reduce the effective number of add/drop interfaces and/or switch optical signal channels to and from clients or client adaptation devices.

In accordance with another aspect of the invention, a photonic switching apparatus includes primary photonic switching logic operably coupled to perform photonic pass-through and add/drop functions. The primary photonic switching logic comprising a plurality of add/drop interfaces. The photonic switching apparatus also includes secondary photonic switching logic operably coupled to the plurality of add/drop interfaces of the primary photonic switching logic for switching dropped optical signals received from the primary photonic switching logic via the plurality of add/drop interfaces to a plurality of clients and for switching optical signals received from the clients to the primary photonic switching logic via the plurality of add/drop interfaces.

The primary photonic switching logic may include a wavelength plane switch or may include multiple photonic switches, such as 2×2 switches or 1×2 switches.

The secondary photonic switching logic may include a photonic cross-connect switch.

The secondary photonic switching logic typically includes a plurality of client interfaces. The number of client interface may be less than the number of add/drop interfaces.

The primary photonic switching logic and the secondary photonic switching logic can operate on a wavelength level.

The primary photonic switching logic and the secondary photonic switching logic can operate on a waveband level.

The primary photonic switching logic can operate on a waveband level while the secondary photonic switching logic operates on a wavelength level. This typically involves the use of channel multiplexers and channel demultiplexers between the primary photonic switching logic and the second photonic switching logic.

The secondary photonic switching logic can use bidirectional add/drop switches or separate unidirectional switches for the add and drop functions.

The photonic switching apparatus may include a demultiplexer for separating optical signals received from an incoming fiber into separate optical signal channels and directing the optical signal channels to the primary photonic switching logic.

The photonic switching apparatus may include a multiplexer for receiving a plurality of optical signal channels from the primary photonic switching logic and multiplexing the plurality of optical signal channels onto an outgoing fiber.

The photonic switching apparatus may include a channel multiplexer/demultiplexer coupled to a client interface of the secondary photonic switching logic for interfacing the secondary photonic switching logic to a plurality of clients through the client interface.

The primary photonic switching logic may include a plurality of wavelength plane switches, and the secondary photonic switching logic may include a plurality of add/drop switches, each add/drop switch operably coupled to all of the wavelength plane switches.

DETAILED DESCRIPTION OF A PREFERRED EMBODIMENT

In an embodiment of the present invention, a photonic switch includes primary photonic switching logic to perform photonic pass-through and add/drop functions and secondary photonic switching logic to reduce the effective number of add/drop interfaces and/or switch optical signal channels to from clients or client adaptation devices. The primary switching logic includes a number of input interfaces, a number of output interfaces, and a number of add/drop interfaces, and performs photonic pass-through and add/drop functions. The secondary photonic switching logic is coupled to the add/drop interfaces of the primary switching logic.

Figure 1:
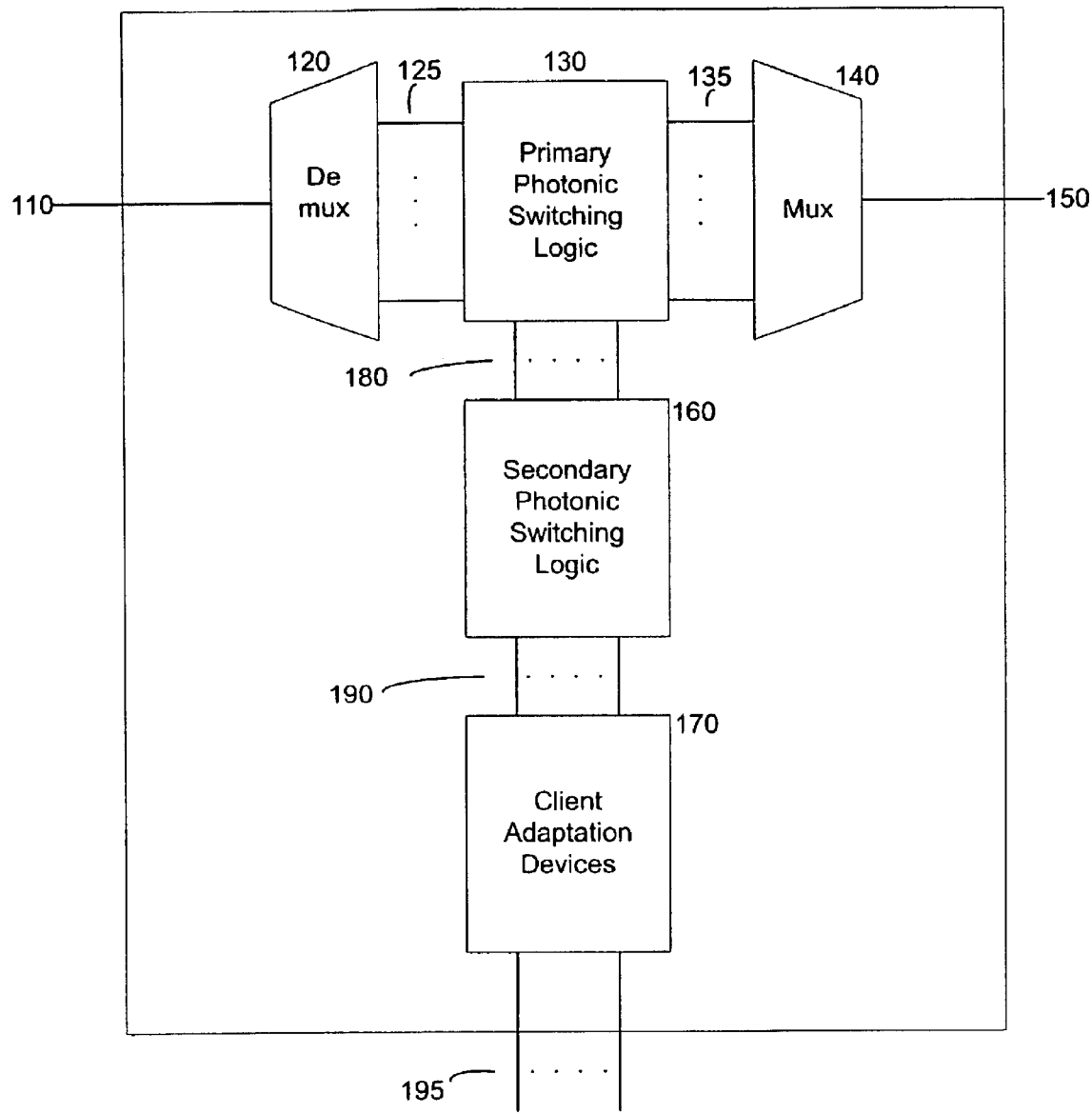
FIG. 1 shows an exemplary photonic switch in accordance with an embodiment of the present invention.

FIG. 1 shows an exemplary photonic switch 100 in accordance with an embodiment of the present invention. Among other things, the photonic switch 100 includes a demultiplexer 120, primary photonic switching logic 130, a multiplexer 140, secondary photonic switching logic 160, and client adaptation devices 170.

The demultiplexer 120 separates the optical signals received from incoming fiber 110 into separate optical signal channels, and directs the optical signal channels to the primary photonic switching logic 130.

The multiplexer 140 receives optical signal channels of different wavelengths from the primary photonic switching logic 130 and multiplexes these optical signal channels onto the outgoing fiber 150.

The primary photonic switching logic 130 performs photonic pass-through and add/drop functions. The primary photonic switching logic 130 is coupled to the demultiplexer 120 through a number of incoming optical interfaces 125, to the multiplexer 140 through a number of outgoing optical interfaces 135, and to the secondary photonic switching logic 160 through a number of add/drop interfaces 180. For each optical signal channel received from the demultiplexer 120 via the incoming optical interfaces 125, the primary photonic switching logic 130 either passes the optical signal channel through to the multiplexer 140 through a selected one of the outgoing optical interfaces 135 for inclusion in signal carried on the outgoing fiber 150 (referred to as a pass-through operation) or drops the optical signal channel to the secondary photonic switching logic 160 through a selected one of the add/drop interfaces 180 (referred to as a drop operation). The primary photonic switching logic 130 also receives optical signal channels from the secondary photonic switching logic 160 through certain add/drop interfaces 180 and switches each such optical signal channel to a selected one of the outgoing optical interfaces 135 for inclusion in the signal carried on the outgoing fiber 150 (referred to as an add operation). The primary photonic switching logic 130 is typically implemented using a single wavelength plane switch (WPS), multiple wavelength plane switches, or multiple photonic switches, although other configurations are possible.

The secondary photonic switching logic 160 switches optical signal channels between the primary photonic switching logic 130 and the client adaptation devices 170. The secondary photonic switching logic 160 is coupled to the primary photonic switching logic 130 through the add/drop interfaces 180 and to the client adaptation devices 170 through a number of client adaptation interfaces 190. The secondary photonic switching logic 160 receives dropped optical signal channels from the primary photonic switching logic 130 via certain of the add/drop interfaces 180 and switches each of the dropped optical signal channels to one or more of the client adaptation interfaces 190. The secondary photonic switching logic 160 also receives optical signal channels from the client adaptation devices 170 via certain of the client adaptation interfaces 190 and switches each of these optical signal channels to a selected one of the add/drop interfaces 180. The secondary photonic switching logic 160 is typically implemented using a single PXC or multiple small optical switches, although other configurations are possible.

The client adaptation devices 170 provide an interface between the clients and the photonic switch 100. The client adaptation devices 170 are coupled to the secondary photonic switching logic 160 through the client adaptation interfaces 190 and to the clients through a number of client interfaces 195. The client adaptation devices 170 may include such things as channel multiplexers and transponders. A channel multiplexer may be used to direct a single dropped optical signal channel to multiple clients or to group multiple clients onto a single input to the additional photonic switching logic 160 (for example, to reduce the number of interfaces, and therefore the complexity, of the secondary photonic switching logic 160. A transponder is essentially an optical transceiver.

The transponder may perform electrical-to-optical and optical-to-electrical conversions, for example, if the client operates in the electrical domain. The transponder may also convert optical signal channels from one wavelength to another wavelength (a function that is often used in WDM applications). The client interfaces 190 may include optical interfaces and/or electrical interfaces.

Figure 2:
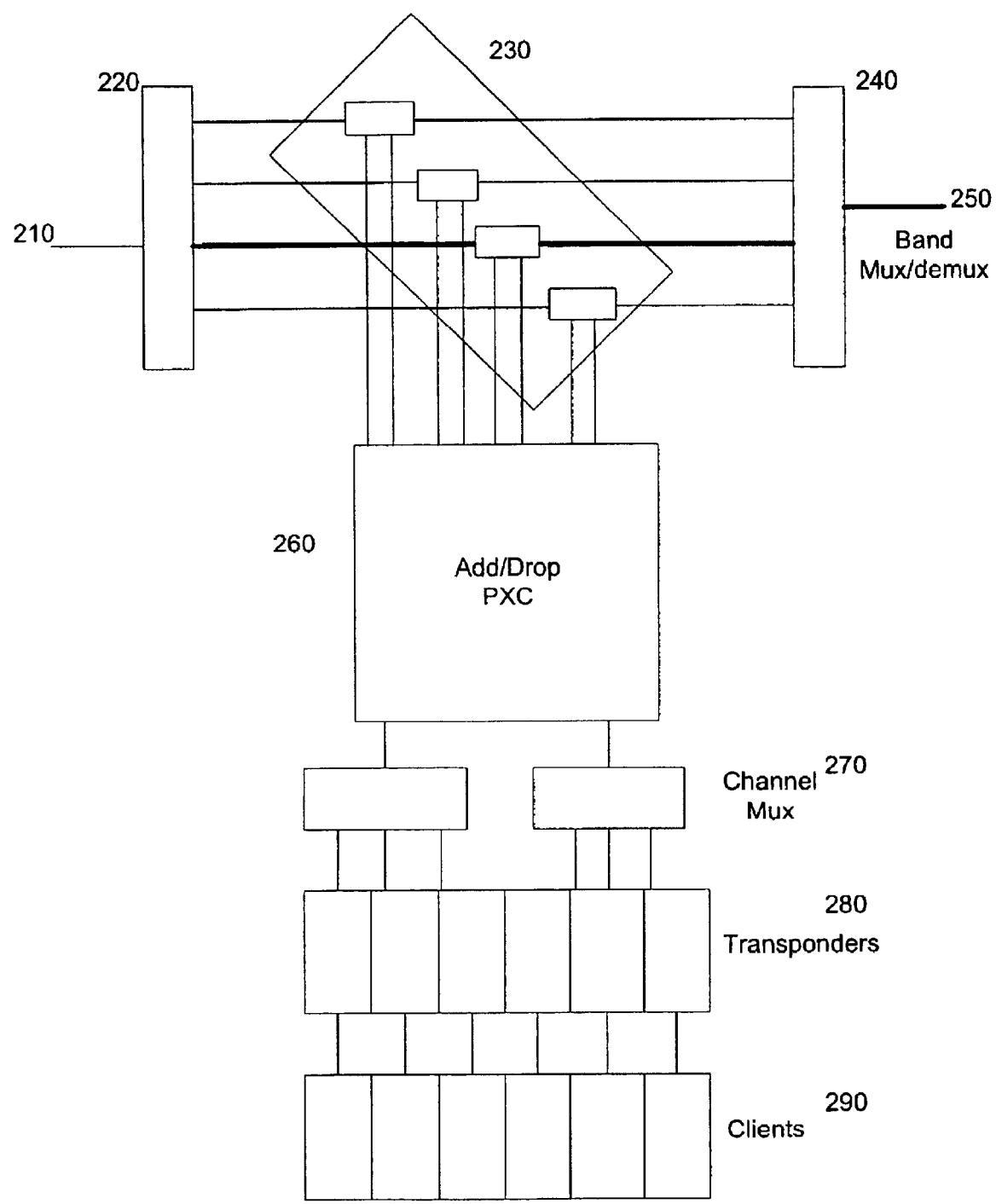
FIG. 2 shows an exemplary photonic switch using a single wavelength plane switch and a single add/drop photonic cross-connect switch in an optical add/drop multiplexer configuration.

FIG. 2 shows an exemplary photonic switch 200 using a single WPS and a single add/drop PXC in an OADM configuration. The photonic switch 200 performs photonic pass-through and add/drop functions between fibers 210 and 250 and clients 290. The photonic switch 200 includes band multiplexer/demultiplexer devices 220 and 240, WPS 230, add/drop PXC 260, channel multiplexers 270, and transponders 280. In this implementation, the WPS 230 is comprised of multiple 2×2 switches.

Figure 3:
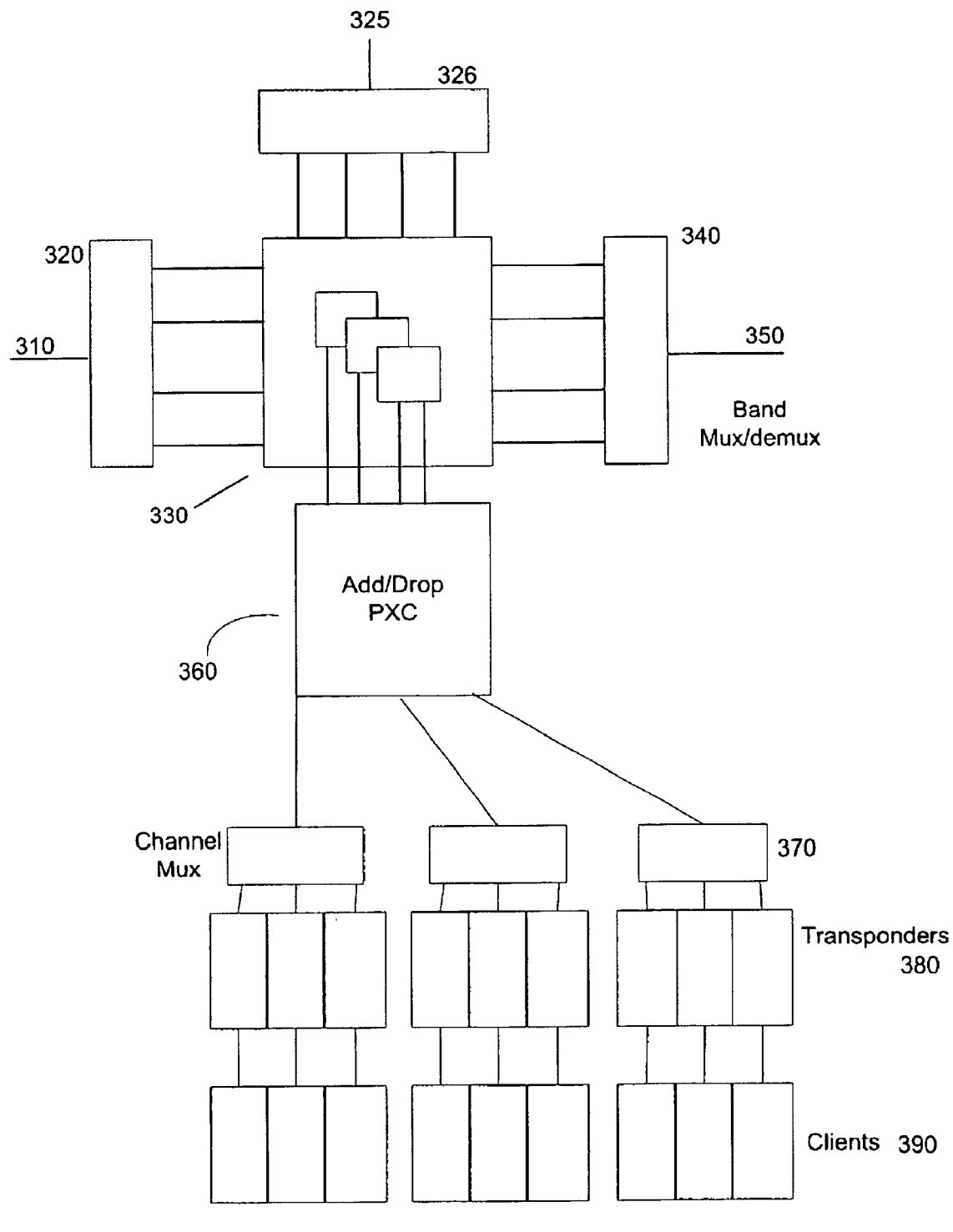
FIG. 3 shows an exemplary photonic switch using a single wavelength plane switch and a single add/drop photonic cross-connect switch in a multi-way configuration.

FIG. 3 shows an exemplary photonic switch 300 using a single WPS and a single add/drop PXC in a multi-way configuration. The photonic switch 300 performs photonic pass-through and add/drop functions between fibers 310, 325, and 350 and clients 290. The photonic switch 300 includes band multiplexer/demultiplexer devices 310, 326, and 340, WPS 330, add/drop PXC 360, channel multiplexers 370, and transponders 380. The WPS 330 connects each switch to three line systems and add/drop interfaces.

Figure 4:
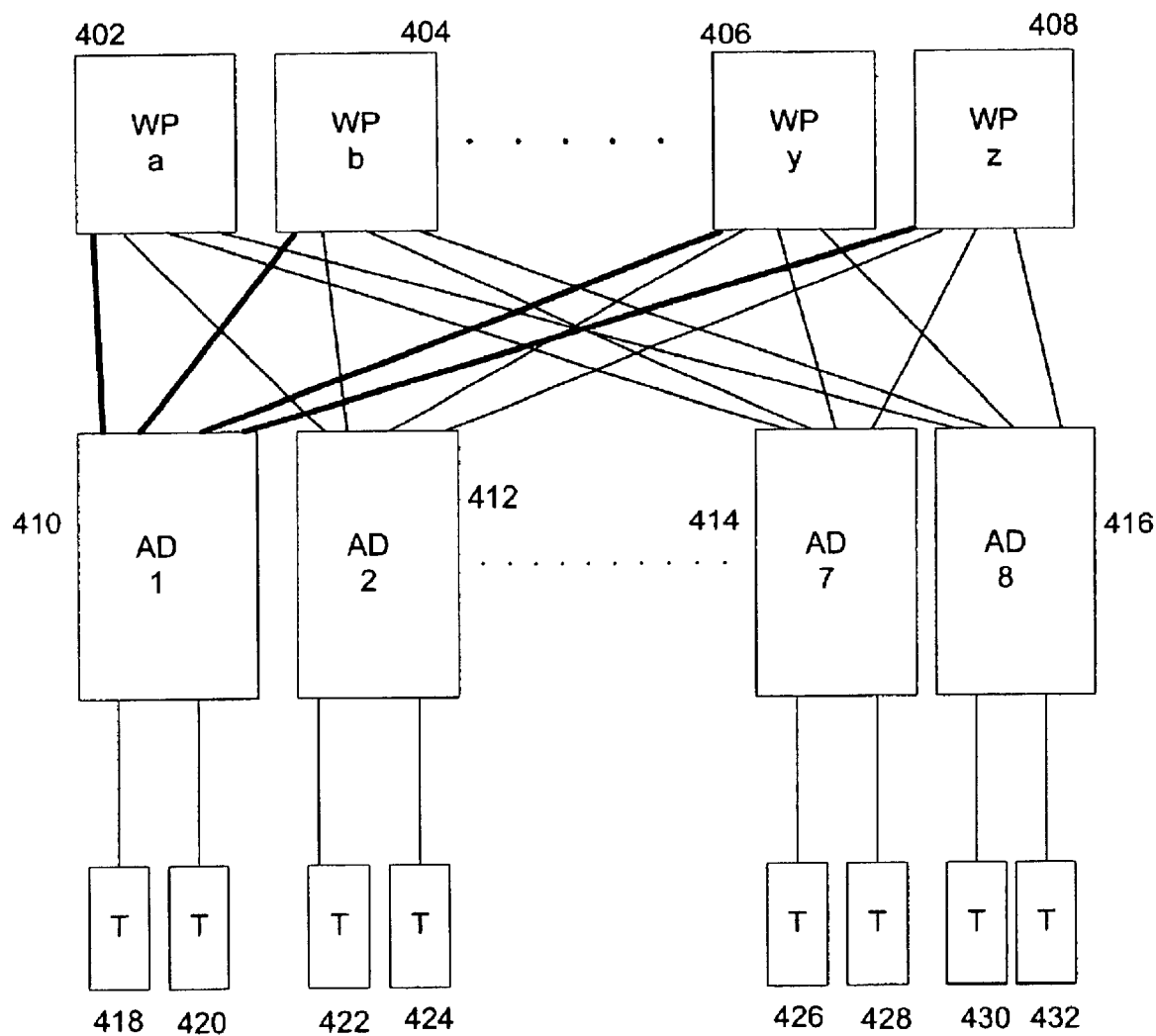
FIG. 4 shows an exemplary photonic switch using multiple wavelength plane switches and multiple additional add/drop switches.

FIG. 4 shows an exemplary photonic switch 400 using multiple wavelength plane (WP) switches WPa–WPz (including WP switches 402, 404, 406, and 408) and multiple additional add/drop (AD) switches AD1–AD8 (including AD switches 410, 412, 414, and 416). For convenience, FIG. 4 does not show the connectivity between WP switches or between the WP switches and the fibers. In this design, each AD switch connects to multiple WP switches so that any client connected to it can be configured to send a signal to as many WP switches as possible. In the exemplary photonic switch 400, each AD switch is connected to all of the WP switches, although the present invention is in no way limited to such an implementation. Each AD switch is associated with a number of transponders. In the exemplary photonic switch 400, AD switch 410 is associated with transponders 418 and 420; AD switch 412 is associated with transponders 422 and 424; AD switch 414 is associated with transponders 426 and 428; and AD switch 416 is associated with transponders 430 and 432.

Figure 5:
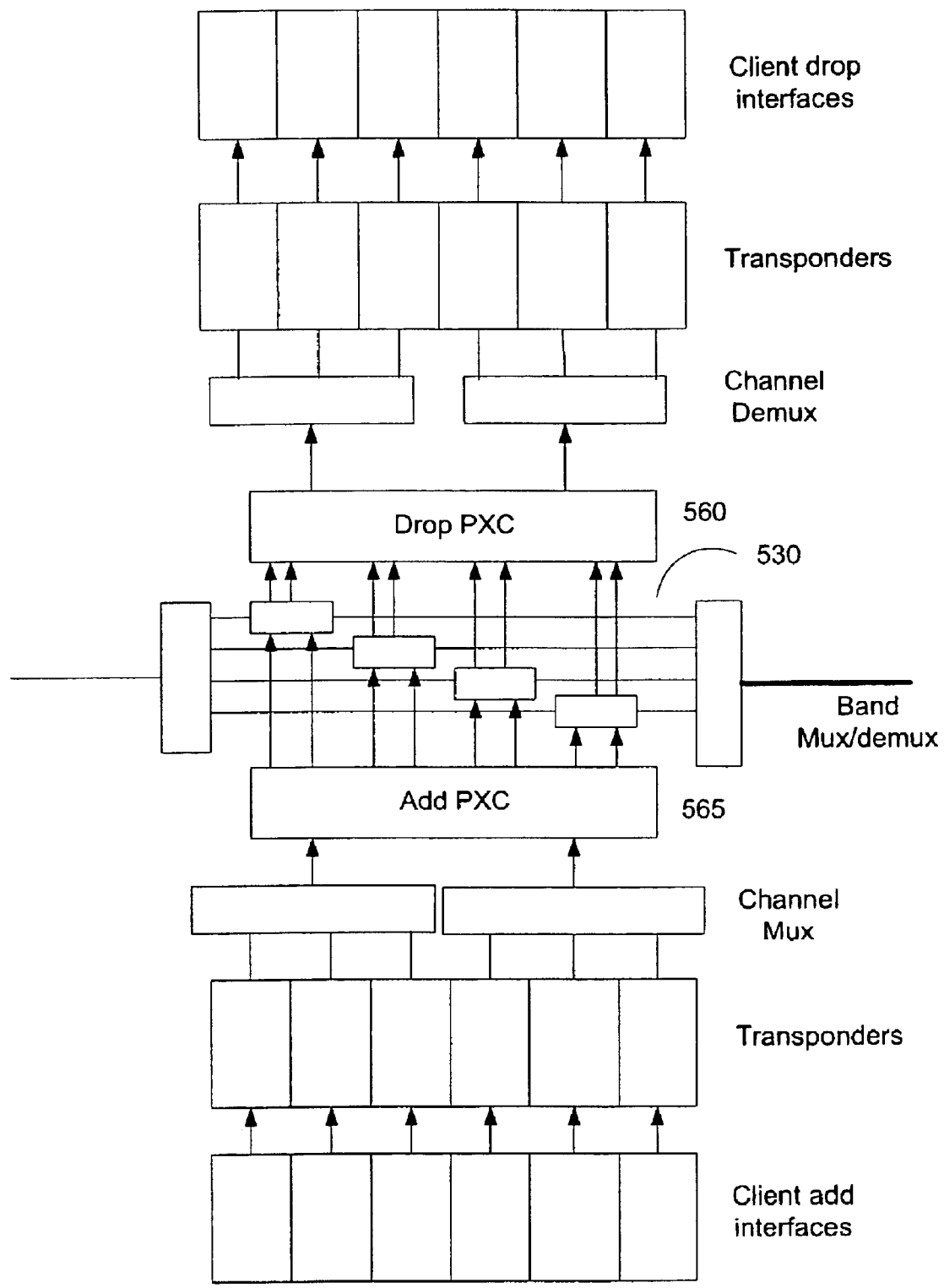
FIG. 5 shows an exemplary photonic switch using separate photonic cross-connect switches for the add and drop functions.

FIG. 5 shows an exemplary photonic switch 500 using separate photonic cross-connect switches for the add and drop functions. Specifically, the photonic switch 500 includes a drop PXC 560 for switching, dropped optical signal channels received from the WPS 530 and an add PXC for switching added optical signal channels to the WPS 530.

Figure 6:
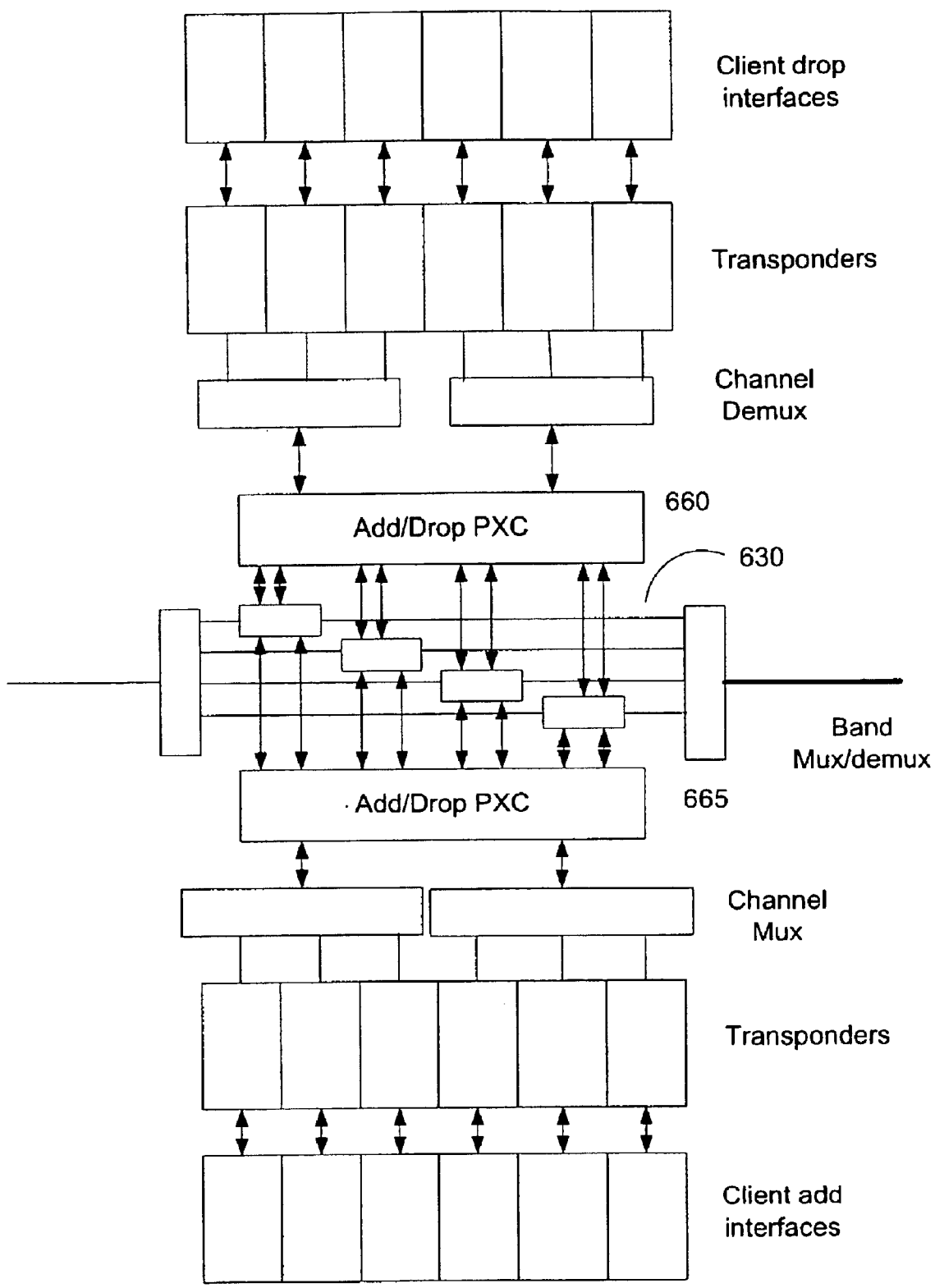
FIG. 6 shows an exemplary photonic switch using add/drop photonic cross-connect switches for the add and drop functions.

FIG. 6 shows an exemplary photonic switch 600 using add/drop photonic cross-connect switches for the add and drop functions. Specifically, the photonic switch 600 includes add/drop photonic cross-connect switches 660 and 665. Each add/drop PXC is capable of both "add" switching and "drop" switching.

With reference again to FIG. 1, it should be noted that channel multiplexers and demultiplexers can be used between the primary photonic switching logic 130 and the secondary photonic switching logic 160 in order to allow the primary photonic switching logic 130 to work at the band level while the secondary photonic switching logic 160 works at the wavelength level. Specifically, channel multiplexers are used to combine multiple wavelengths from the secondary photonic switching logic 160 into a single waveband for the primary photonic switching logic 130, and channel demultiplexers are used to separate individual wavelengths from a waveband for the secondary photonic switching logic 160.

Figure 7:
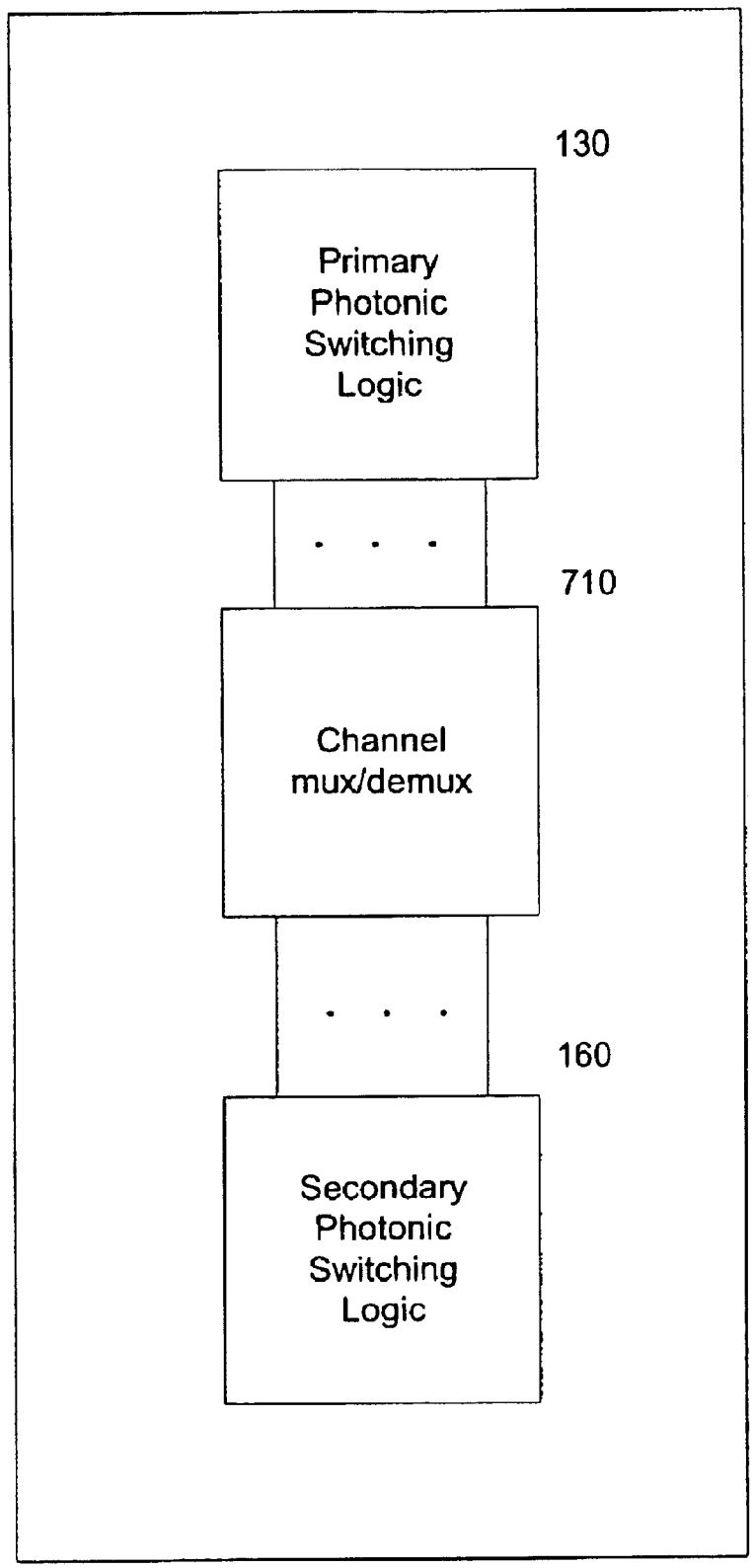
FIG. 7 shows an exemplary photonic switch including channel multiplexers and demultiplexers to enable the primary photonic switching logic to work at the band level while the secondary photonic switching logic works at the wavelength level.

FIG. 7 shows an exemplary photonic switch 700 including channel multiplexers and demultiplexers 710 to enable the primary photonic switching logic 130 to work at the band level while the secondary photonic switching logic 160 works at the wavelength level.

With reference again to FIG. 1, the secondary photonic switching logic 160 can be used to reduce the effective number of add/drop interfaces between the primary photonic switching logic 130 and the clients. For convenience, such a photonic switch is referred to hereinafter as a hybrid switch.

Figure 8:
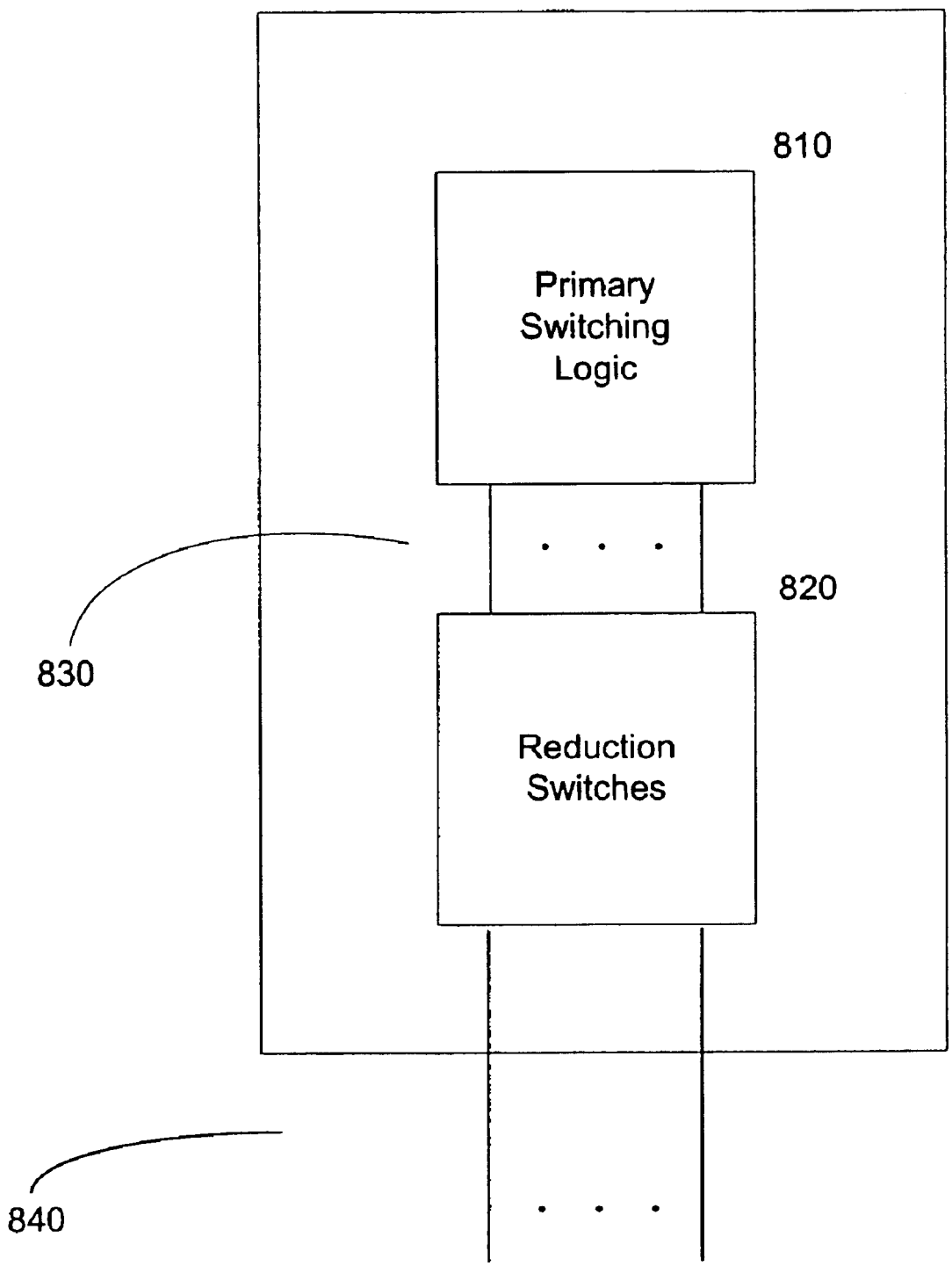
FIG. 8 shows an exemplary hybrid switch having reduction switches that reduce the effective number of add/drop interfaces in accordance with an embodiment of the present invention.

FIG. 8 shows an exemplary hybrid switch 800 in accordance with an embodiment of the present invention. Among other things, the hybrid switch 800 includes primary switching logic 810 and reduction switches 820 (i.e., additional photonic switching logic used to reduce the number of add/drop interfaces). The reduction switches 820 have M interfaces 830 to the primary switching logic 810 and N interfaces 840 to the clients, where M is greater than N.

The primary switching logic 810 may be connected to a subset of wavelengths in one or more fiber directions. This can be done using a WPS or 1×2 add/drop switches. The reduction switches 820 can be a single stage photonic cross-connect.

The reduction switches 820 can connect each add/drop interface to a port on at least two switches of the primary switching logic 810.

Within the hybrid switch 800, switching can be done at the band level, the wavelength level, or, using channel multiplexers and demultiplexers between the primary switching logic 810 and the reduction switches 820, at both the band level and the wavelength level.

The reduction switches 820 can operate in a unidirectional fashion, in which case two sets of reduction switches are needed for add/drop functionality, or in a bidirectional fashion.

It should be noted that the hybrid switch 800 can have more switches, in addition to the reduction switches 820, for switching between the clients and the reduction switches 820.

The present invention may be embodied in other specific forms without departing from the true scope of the invention. The described embodiments are to be considered in all respects only as illustrative and not restrictive.

What is claimed is:

1. A photonic switching apparatus comprising:
   primary photonic switching logic having a plurality of incoming optical interfaces, a plurality of outgoing optical interfaces, and a plurality of add/drop interfaces; and
   secondary photonic switching logic coupled to the primary photonic switching logic through the plurality of add/drop interfaces and having a plurality of client adaptation interfaces, wherein:
   the primary photonic switching logic is operably coupled to switch each of a number of optical signal channels received from the incoming optical interfaces to a selected one of the outgoing optical interfaces or to a selected one of the add/drop interfaces and to switch each of a number of optical signal channels received from the add/drop interfaces to a selected one of the outgoing optical interfaces; and
   the secondary photonic switching logic is operably coupled to switch each of a number of optical signal channels received from the add/drop interfaces to at least one of the client adaptation interfaces and to switch each of a number of optical signal channels received from the client adaptation interfaces to a selected one of the add/drop interfaces.

2. The photonic switching apparatus of claim 1, wherein the primary photonic switching logic comprises a wavelength plane switch.

3. The photonic switching apparatus of claim 1, wherein the primary photonic switching logic comprises a plurality of photonic switches.

4. The photonic switching apparatus of claim 1, wherein the secondary photonic switching logic comprises a photonic cross-connect switch.

5. The photonic switching apparatus of claim 1, wherein the secondary photonic switching logic comprises a plurality of client adaptation interfaces, and wherein the number of client adaptation interfaces is less than the number of add/drop interfaces.

6. The photonic switching apparatus of claim 1, wherein the primary photonic switching logic and the secondary photonic switching logic operate on a wavelength level.

7. The photonic switching apparatus of claim 1, wherein the primary photonic switching logic and the secondary photonic switching logic operate on a waveband level.

8. The photonic switching apparatus of claim 1, further comprising a number of channel multiplexers and a number of channel demultiplexers operably coupled between the primary photonic switching logic and the second photonic switching logic, and wherein the primary photonic switching logic operates on a waveband level and the secondary photonic switching logic operates on a wavelength level.

9. The photonic switching apparatus of claim 1, wherein the secondary photonic switching logic comprises at least one bidirectional add/drop switch.

10. The photonic switching apparatus of claim 1, wherein the secondary photonic switching logic comprises at least one unidirectional add switch and at least one unidirectional drop switch.

11. The photonic switching apparatus of claim 1, further comprising:
a demultiplexer operably coupled to separate optical signals received from an incoming fiber into separate optical signal channels and direct the optical signal channels to the primary photonic switching logic.

12. The photonic switching apparatus of claim 1, further comprising:
a multiplexer operably coupled to receive a plurality of optical signal channels from the primary photonic switching logic and multiplex the plurality of optical signal channels onto an outgoing fiber.

13. The photonic switching apparatus of claim 1, wherein the secondary photonic switching logic comprises a client interface, and wherein the photonic switching apparatus further comprises:
a channel multiplexer/demultiplexer operably coupled to the client interface for interfacing the secondary photonic switching logic to a plurality of clients through the client interface.

14. The photonic switching apparatus of claim 3, wherein the plurality of photonic switches comprises a plurality of 2×2 switches.

15. The photonic switching apparatus of claim 3, wherein the plurality of photonic switches comprises a plurality of 1×2 switches.

16. The photonic switching apparatus of claim 1, wherein the primary photonic switching logic comprises a plurality of wavelength plane switches, and wherein the secondary photonic switching logic comprises a plurality of add/drop switches, each add/drop switch operably coupled to all of the wavelength plane switches.

17. A photonic switching method comprising:
switching, by primary photonic switching logic, each of a number of optical signal channels received from a plurality of incoming optical interfaces to a selected one of a plurality of outgoing optical interfaces or to a selected one of a plurality of add/drop interfaces;
switching, by the primary photonic switching logic, each of a number of optical signal channels received from the add/drop interfaces to a selected one of the outgoing optical interfaces;
switching, by secondary photonic switching logic, each of a number of optical signal channels received from the add/drop interfaces to at least one of a plurality of client adaptation interfaces; and
switching, by the secondary photonic switching logic, each of a number of optical signal channels received from the client adaptation interfaces to a selected one of the add/drop interfaces.

18. The photonic switching method of claim 17, wherein the primary photonic switching logic comprises one of:
a wavelength plane switch;
a plurality of photonic switches; and
a photonic cross-connect switch.

19. The photonic switching method of claim 17, wherein the number of client adaptation interfaces is less than the number of add/drop interfaces.

20. The photonic switching method of claim 17, wherein the primary photonic switching logic and the secondary photonic switching logic operate on one of:
a wavelength level; and
a waveband level.

* * * * *